March 4, 1958  E. F. FREKKO  2,825,855
ELECTROLYTIC CAPACITOR
Filed Sept. 29, 1954
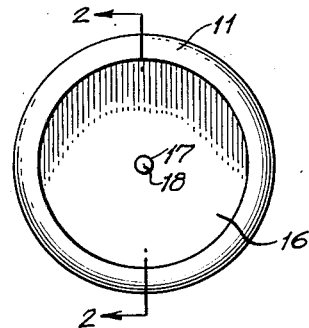
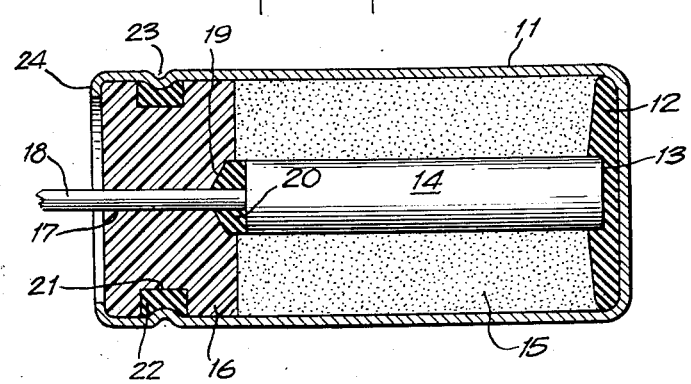
INVENTOR.
EUGENE F. FREKKO
BY
W. D. Keith,
ATTORNEY

2,825,855

ELECTROLYTIC CAPACITOR

Eugene F. Frekko, Westfield, N. J., assignor to Cornell-Dubilier Electric Corporation, South Plainfield, N. J., a corporation of Delaware Application September 29, 1954, Serial No. 459,170

12 Claims. (Cl. 317—230)

This invention is concerned with an electrolytic capacitor. More specifically the invention is concerned with improvements in the construction of an electrolytic capacitor, most especially of the type that is in the so-called "miniature" class.

In recent electronic equipment of the type that is now being manufactured which employs the use of transistors or the like, there is a need for extreme reduction in the size of the various component elements, in order to take advantage of the space saving qualities of equipment of this type. The use of such reduced size for capacitors has created some specific problems with regard to the electrolytic type of capacitors. The size involved necessitates a reduction in the size of the central or anode terminal of such capacitors to the point where this terminal, which is ordinarily in the form of a round wire, becomes relatively fragile and is therefore subject to breaking from various causes.

Consequently, it is an object of this invention to provide an electrolytic capacitor that has an extremely effective support for the central electrode terminal, while at the same time an effective seal is created around this terminal to prevent leakage of the electrolyte.

Briefly, the invention is concerned with an electrolytic capacitor having a metallic container open at one end only, wherein said container forms one electrode of said capacitor and contains a centrally located electrode electrically insulated from said container and surrounded by an electrolyte. The central electrode includes an extension of relatively small cross-sectional dimensions. Such capacitor also includes a relatively hard insulating material plug having a centrally located passage therethrough for admitting the extension, said plug being relatively thick to lend lateral support to said extension, said passage having an enlarged recess at the inside end thereof and being tapered away from the inside, and a relatively soft resilient material washer surrounding said extension and cooperating with said recess for sealing and gripping the extension.

The above and other objects and benefits of this invention will be more fully appreciated in connection with the description below and the showings made in the drawings, all by way of example. Referring to the drawings:

Fig. 1 is a top plan view of the capacitor according to this invention; and

Fig. 2 is a longitudinal cross-section view taken along the line 2—2 of Fig. 1.

The capacitor illustrated in the drawings includes a metallic container 11 having any convenient shape, but being illustrated as a generally cylindrical cup-like container having only one end open. This container 11 may be constructed of any satisfactory material, usually a metallic substance, e. g. copper, silver or silver plated copper, and constitutes one electrode of the capacitor. Located at the bottom of the container 11, there is an insulating material disc-like support 12 that has a centrally located recess 13 therein for receiving one extremity of an anode 14. This anode 14 constitutes the other electrode of the capacitor and may take any convenient shape. However, it is preferred that the cross-sectional configuration of this anode 14 should match or be similar to the cross-sectional shape of the walls of container 11, so that the entire surface of anode 14 will be equi-distant at all points from the inner surface of metallic container 11. Surrounding the anode 14 and filling the container 11, there is an electrolyte 15 which may be any satisfactory electrolyte, e. g. sulphuric acid. Near the open end of container 11 there is a relatively thick plug 16 that is constructed of any plastic or ceramic insulating material so long as it is impervious to the electrolyte 15. This plug 16 is a relatively hard substance and there is included a centrally located passage 17 having the same cross-sectional configuration as an extension 18 of the anode 14. In the usual construction of capacitors of this type the elements will generally be circular in cross-section, as illustrated, for ease of manufacturing. The passage 17 includes a recess 19 at the inside end thereof which has a tapered configuration, as illustrated, for creating a wedging effect in cooperation with a washer 20 that surrounds the extension 18 close to the anode 14. The recess 19 is formed concentrically around the passage 17 and has a cylindrical walled portion entering from the inside face of plug 16. Then there is a frusto-conical surface joining the passage 17 and the cylindrical walled portion of the recess 19. The washer 20 is constructed of a relatively soft resilient material (impervious to the electrolyte) such that a tight and effective seal may be created when the plug 16 is pressed into place within the container 11. The plug 16 has an annular groove 21, located about midway of the thickness of the plug, that is adapted to receive another relatively soft resilient material ring or washer 22 for creating an effective seal at the periphery of the plug 16. Ring 22 must also be impervious to the electrolyte.

In assembling the capacitor, the support 12 is placed snugly against the closed end of the container 11 and the anode 14 is set securely into the recess 13, while the electrolyte 15 is introduced within the container 11 around the anode 14. Then the plug 16 is slid over the anode extension 18 with the washer 20 in place, either on the extension 18 (at the end of anode 14) or within the recess 19 of plug 16, so that the plug 16 may be pressed down into place within the container 11 with sufficient force for compressing washer 20 to create a tight seal that will retain electrolyte 15, as well as the salts that are chemically formed during the life of the capacitor. Then, in order to maintain pressure on the washer 20, the plug 16 (which has the ring 22 already placed within the groove 21) will be secured in place in the open end of container 11 by spinning over the edge 24 thereof as shown, to maintain the plug 16 in place to exert the compressive force that is applied to the washer 20. A recess or negative bead 23 will be spun around the periphery of the container 11 over the location of ring 22, so as to compress the resilient material ring 22 sufficiently to create a tight seal for containing the electrolyte from seeping out between the container 11 and plug 16.

It will be noted that the plug 16 has relatively great thickness so as to adequately support the extension 18 for avoiding breakage thereof due to bending, which ordinarily would tend to weaken the extension close to its connection with the anode 14. Furthermore, whenever the extension 18 is subjected to longitudinal pull for any cause, the strain of such pull is absorbed by the wedging action of the washer 20 as it acts in conjunction with the conical surface of recess 19 in such a way as to grip the extension 18 and so relieve the tension which would be otherwise applied at the connection of extension 18 with its anode 14.

While a specific embodiment of the invention has been described in detail in accordance with the applicable statutes, this is not to be taken as in any way limiting the invention, but merely as being descriptive thereof.

It is claimed:

1. In an electrolytic capacitor having a metallic container open at one end only, said container forming one electrode of said capacitor and containing a centrally located electrode electrically insulated from said container and surrounded by an electrolyte, said central electrode including an extension of relatively small cross-sectional dimensions, the improvement comprising a relatively hard insulating material plug having a centrally located passage therethrough for admitting said extension, said plug being relatively thick to lend lateral support to said extension, said passage having an enlarged recess therein, said recess having an end wall tapered toward the open end of said container and intersecting said passage, and a relatively soft resilient material washer surrounding said extension and cooperating with said recess for sealing and gripping the extension.

2. In an electrolytic capacitor having a metallic container open at one end only, said container forming one electrode of said capacitor and containing a centrally located electrode electrically insulated from said container and surrounded by an electrolyte, said central electrode including an extension of relatively small cross-sectional dimensions, the improvement comprising a relatively hard insulating material plug having a centrally located passage therethrough for admitting said extension, said plug being relatively thick to lend lateral support to said extension, said passage having an enlarged recess at the inside end thereof, said recess having an end wall tapered away from the inside end of the passage and intersecting the passage, a relatively soft resilient material washer surrounding said extension and cooperating with said recess for sealing and gripping the extension, a groove in the outer periphery of said plug, a relatively soft resilient material ring cooperating with said groove, and means for compressing said ring to form a tight seal between said container and said plug.

3. In an electrolytic capacitor having a metallic container open at one end only, said container forming one electrode of said capacitor and containing a centrally located electrode electrically insulated from said container and surrounded by an electrolyte, said central electrode including an extension of relatively small cross-sectional dimensions, the improvement comprising a relatively hard insulating material plug having a centrally located passage therethrough for admitting said extension, said plug being relatively thick to lend lateral support to said extension, said passage having an enlarged recess at the inside end thereof, said recess having an end wall tapered away from the inside end of the passage and intersecting the passage, a relatively soft resilient material washer surrounding said extension and cooperating with said recess for sealing and gripping the extension, a groove in the outer periphery of said plug, a relatively soft resilient material ring cooperating with said groove, means for compressing said ring to form a tight seal between said container and said plug, and an insulating material disc adjacent the closed end of said container, said disc having a solid bottomed socket for supporting an extremity of said central electrode while maintaining insulating material between the closed end of said container and said central electrode.

4. In an electrolytic capacitor having a metallic container open at one end only, said container forming one electrode of said capacitor and containing a centrally located electrode electrically insulated from said container and surrounded by an electrolyte, said central electrode including an extension of relatively small cross-sectional dimensions, the improvement comprising a relatively hard insulating material plug having a centrally located passage therethrough for admitting said extension, said plug being relatively thick to lend lateral support to said extension, said passage having a concentric cylindrical enlarged recess at the inside end thereof, a frusto-conical surface joining said recess to said passage, and a relatively soft resilient material washer surrounding said extension and cooperating with said recess for sealing and gripping the extension.

5. In an electrolytic capacitor having a metallic container open at one end only, said container forming one electrode of said capacitor and containing a centrally located electrode electrically insulated from said container and surrounded by an electrolyte, said central electrode including an extension of relatively small cross-sectional dimensions, the improvement comprising a relatively hard insulating material plug having a centrally located passage therethrough for admitting said extension, said plug being relatively thick to lend lateral support to said extension, said passage having a concentric cylindrical enlarged recess at the inside end thereof, a frusto-conical surface joining said recess to said passage, a relatively soft resilient material washer surrounding said extension and cooperating with said recess for sealing and gripping the extension, a groove in the outer periphery of said plug, a relatively soft resilient material ring cooperating with said groove, and means for compressing said ring to form a tight seal between said container and said plug.

6. In an electrolytic capacitor having a metallic container open at one end only, said container forming one electrode of said capacitor and containing a centrally located electrode electrically insulated from said container and surrounded by an electrolyte, said central electrode including an extension of relatively small cross-sectional dimensions, the improvement comprising a relatively hard insulating material plug having a centrally located passage therethrough for admitting said extension, said plug being relatively thick to lend lateral support to said extension, said passage having a concentric cylindrical enlarged recess at the inside end thereof, a frusto-conical surface joining said recess to said passage, a relatively soft resilient material washer surrounding said extension and cooperating with said recess for sealing and gripping the extension, a groove in the outer periphery of said plug, a relatively soft resilient material ring cooperating with said groove, and means for compressing said ring to form a tight seal between said container and said plug, and an insulating material disc adjacent the closed end of said container, said disc having a depression therein for supporting an extremity of said central electrode while maintaining insulating material between the closed end of said container and said central electrode.

7. In an electrolytic capacitor having a metallic container open at one end only, said container forming one electrode of said capacitor and containing a centrally located electrode electrically insulated from said container and surrounded by an electrolyte, said central electrode including an extension of relatively small cross-sectional dimensions, the improvement comprising a relatively hard insulating material plug having a centrally located passage therethrough for admitting said extension, said plug being relatively thick to lend lateral support to said extension, said passage having a concentric cylindrical enlarged recess at the inside end thereof, a frusto-conical surface joining said recess to said passage, a relatively soft resilient material washer surrounding said extension and cooperating with said recess for sealing and gripping the extension, a groove in the outer periphery of said plug, a relatively soft resilient material ring cooperating with said groove, and means for compressing said ring to form a tight seal between said container and said plug, and an insulating material disc adjacent the closed end of said container, said disc having a depression therein for supporting an extremity of said central electrode while maintaining insulating material between the closed end of said container and said central electrode, and a flange formed on the edges of said container at the open end thereof for holding said plug in place in the end of the container with pressure applied to said washer to create a tight seal around said extension.

8. In an electrolytic capacitor having a metallic container open at one end only, said container forming one electrode of said capacitor and containing a centrally located electrode electrically insulated from said container and surrounded by an electrolyte, said central electrode including an extension of relatively small cross-sectional dimensions, the improvement comprising a relatively hard insulating material plug having a centrally located passage therethrough for admitting said extension, said plug being relatively thick to lend lateral support to said extension, said passage having an enlarged recess at the inside end thereof, said recess having an end wall tapered away from the inside end of the passage and intersecting the passage, a relatively soft resilient material washer surrounding said extension and cooperating with said recess for sealing and gripping the extension, a groove in the outer periphery of said plug, a relatively soft resilient material ring cooperating with said groove, and an annular crimp formed in said container over said ring for compressing the ring to form a tight seal between said container and said plug.

9. In an electrolytic capacitor having a metallic container open at one end only, said container forming one electrode of said capacitor and containing a centrally located electrode electrically insulated from said container and surrounded by an electrolyte, said central electrode including an extension of relatively small cross-sectional dimensions, the improvement comprising a relatively hard insulating material plug having a centrally located passage therethrough for admitting said extension, said plug being relatively thick to lend lateral support to said extension, said passage having an enlarged recess at the inside end thereof, said recess having an end wall tapered away from the inside end of the passage and intersecting the passage, a relatively soft resilient material washer surrounding said extension and cooperating with said recess for sealing and gripping the extension, a groove in the outer periphery of said plug, a relatively soft resilient material ring cooperating with said groove, an annular crimp formed in said container over said ring for compressing the ring to form a tight seal between said container and said plug, and an insulating material disc adjacent the closed end of said container, said disc having a depression therein for supporting an extremity of said central electrode while maintaining insulating material between the closed end of said container and said electrode.

10. In an electrolytic capacitor having a metallic container open at one end only, said container forming one electrode of said capacitor and containing a centrally located electrode electrically insulated from said container and surrounded by an electrolyte, said central electrode including an extension of relatively small cross-sectional dimensions, the improvement comprising a relatively hard insulating material plug having a centrally located passage therethrough for admitting said extension, said plug being relatively thick to lend lateral support to said extension, said passage having a concentric cylindrical enlarged recess at the inside end thereof, a frusto-conical surface joining said recess to said passage, a relatively soft resilient material washer surrounding said extension and cooperating with said recess for sealing and gripping the extension, a groove in the outer periphery of said plug, a relatively soft resilient material ring cooperating with said groove, and an annular crimp formed in said container over said ring for compressing the ring to form a tight seal between said container and said plug.

11. In an electrolytic capacitor having a metallic container open at one end only, said container forming one electrode of said capacitor and containing a centrally located electrode electrically insulated from said container and surrounded by an electrolyte, said central electrode including an extension of relatively small cross-sectional dimensions, the improvement comprising a relatively hard insulating material plug having a centrally located passage therethrough for admitting said extension, said plug being relatively thick to lend lateral support to said extension, said passage having a concentric cylindrical enlarged recess at the inside end thereof, a frusto-conical surface joining said recess to said passage, a relatively soft resilient material washer surrounding said extension and cooperating with said recess for sealing and gripping the extension, a groove in the outer periphery of said plug, a relatively soft resilient material ring cooperating with said groove, an annular crimp formed in said container over said ring for compressing the ring to form a tight seal between said container and said plug, and an insulating material disc adjacent the closed end of said container, said disc having a depression therein for supporting an extremity of said central electrode while maintaining insulating material between the closed end of said container and said central electrode.

12. In an electrolytic capacitor having a metallic container open at one end only, said container forming one electrode of said capacitor and containing a centrally located electrode electrically insulated from said container and surrounded by an electrolyte, said central electrode including an extension of relatively small cross-sectional dimensions, the improvement comprising a relatively hard insulating material plug having a centrally located passage therethrough for admitting said extension, said plug being relatively thick to lend lateral support to said extension, said passage having a concentric cylindrical enlarged recess at the inside end thereof, a frusto-conical surface joining said recess to said passage, a relatively soft resilient material washer surrounding said extension and cooperating with said recess for sealing and gripping the extension, a groove in the outer periphery of said plug, a relatively soft resilient material ring cooperating with said groove, an annular crimp formed in said container over said ring for compressing the ring to form a tight seal between said container and said plug, an insulating material disc adjacent the closed end of said container, said disc having a depression for supporting an extremity of said central electrode while maintaining insulating material between the closed end of said container and said central electrode, and a flange formed on the edges of said container at the open end thereof for holding said plug in place in the end of the container with pressure applied to said washer to create a tight seal around said extension.

References Cited in the file of this patent

UNITED STATES PATENTS

| | | |
|---|---|---|
| 2,177,018 | Claassen | Oct. 24, 1939 |
| 2,616,953 | Booe | Nov. 4, 1952 |
| 2,628,271 | Brafman | Feb. 10, 1953 |